United States Patent
Choi et al.

(10) Patent No.: US 10,518,835 B2
(45) Date of Patent: Dec. 31, 2019

(54) DROP-OUT STRUCTURE FOR WHEEL ALIGNMENT

(71) Applicant: Hyundai Motor Company, Seoul (KR)

(72) Inventors: Jungnam Choi, Seongnam-si (KR); Sung Dae Lim, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 238 days.

(21) Appl. No.: 15/379,044

(22) Filed: Dec. 14, 2016

(65) Prior Publication Data

US 2018/0111656 A1 Apr. 26, 2018

(30) Foreign Application Priority Data

Oct. 20, 2016 (KR) .................. 10-2016-0136736

(51) Int. Cl.
*B62K 25/02* (2006.01)
*B62K 3/02* (2006.01)
*B62K 19/18* (2006.01)

(52) U.S. Cl.
CPC .............. *B62K 25/02* (2013.01); *B62K 3/02* (2013.01); *B62K 19/18* (2013.01); *B62K 2025/025* (2013.01)

(58) Field of Classification Search
CPC ......................... B62D 25/02; B62D 2025/025
See application file for complete search history.

(56) References Cited

U.S. PATENT DOCUMENTS

| 5,029,819 | A | * | 7/1991 | Kane | ..................... | E01F 13/028 |
| | | | | | | 160/24 |
| 5,058,913 | A | | 10/1991 | La Riviere et al. | | |
| 5,082,303 | A | * | 1/1992 | Duehring | ............... | B62K 25/02 |
| | | | | | | 280/284 |
| 5,096,215 | A | * | 3/1992 | Chonan | .................. | B62K 25/02 |
| | | | | | | 280/281.1 |
| 5,292,143 | A | | 3/1994 | Stauch et al. | | |
| 8,740,239 | B2 | * | 6/2014 | Lumpkin | ............... | B62K 19/30 |
| | | | | | | 280/285 |
| 8,899,606 | B2 | * | 12/2014 | Cocalis | ..................... | B62K 3/02 |
| | | | | | | 280/281.1 |
| 9,415,828 | B2 | | 8/2016 | Norstad | | |
| 9,545,971 | B2 | * | 1/2017 | Beutner | ................... | B62K 3/02 |
| 2011/0042917 | A1 | * | 2/2011 | Cleveland | .............. | B62K 19/24 |
| | | | | | | 280/288 |
| 2015/0259026 | A1 | | 9/2015 | Norstad | | |
| 2018/0170477 | A1 | * | 6/2018 | Choi | ...................... | B62K 25/02 |

FOREIGN PATENT DOCUMENTS

| CN | 2382638 Y | 6/2000 |
| CN | 102963476 A | 3/2013 |
| GB | 181184 A | 6/1922 |
| GB | 200987 A | 7/1923 |

(Continued)

*Primary Examiner* — Tony H Winner
(74) *Attorney, Agent, or Firm* — Morgan, Lewis & Bockius LLP

(57) ABSTRACT

A bicycle frame structure that is manufactured by forming left and right panels and then bonding them in a pipe in/are configured to include a first fixing member fixed to the rear end portion of a chain stay and a hanger coupled to the first fixing member, being configured for rotating around a hinge pin, and having an axle slit formed in a predetermined direction.

12 Claims, 6 Drawing Sheets

(56) References Cited

FOREIGN PATENT DOCUMENTS

| | | | |
|---|---|---|---|
| JP | 2004-352194 | A | 12/2004 |
| JP | 2013-252784 | A | 12/2013 |
| KR | 10-1556383 | B1 | 9/2015 |
| KR | 10-2016-0045046 | A | 4/2016 |
| TW | 496361 | U | 7/2002 |

* cited by examiner

DROP-OUT STRUCTURE FOR WHEEL ALIGNMENT

CROSS-REFERENCE TO RELATED APPLICATION

The present application claims priority to Korean Patent Application No. 10-2016-0136736 filed on Oct. 20, 2016, the entire contents of which is incorporated herein for all purposes by this reference.

BACKGROUND OF THE INVENTION

Field of the Invention

Various embodiments of the present invention relates to a drop-out structure for wheel alignment for manufacturing a bicycle frame by stamping and bonding left and right panels and then mounting a wheel on the frame.

Description of Related Art

Existing bicycle frames are composed of a head tube, a seat tube, a top tube, a down tube, a seat stay, and a chain stay.

That is, a steering handle assembly is coupled to the upper end of the head tube, a front wheel-rotary connector is coupled to the lower end of the head tube, a seat connector is coupled to the upper end of the seat tube, and a chain actuator is coupled to the lower end of the seat tube.

The top tube and the down tube connect and support the head tube and the seat tube, and the seat stay and the chain stay connect and support a rear wheel-rotary connector and the seat tube.

On the other hand, the bicycle frame may be equipped with both of the top tube and the down tube, but in some cases, one main tube (not shown) may be connected between the head tube and the seat tube.

The existing bicycle frame are manufactured by making a top tube, a down tube, and a seat tube from a tube, which is a basic material, and then welding them, but this process is difficult to automate, so workability is low and the manufacturing cost may be increased.

Accordingly, a study for improving workability and durability by performing hot stamping on a bicycle frame and then bonding them to the left and right has recently been conducted.

However, it is difficult to make a tube-shaped frame by hot-stamping left and right panels and bonding them and to precisely align a rear wheel in consideration of welding deformation. Accordingly, a study for manufacturing a structure that can precisely adjust wheel alignment on a hot-stamped frame has been conducted.

In particular, when the left and right stays are twisted and wheel alignment is changed, a loss of power increases and, eccentric wear of a tire increases and load is eccentrically concentrated, so the frame may be broken by accumulation of fatigue.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a drop-out structure for wheel alignment that can reduce a loss of power by easily and precisely adjusting wheel alignment even if left and right stays are twisted with respect to each other in a stamping frame structure, reduce eccentric wear of a tire, and reduce damage to frame due to accumulation of eccentric fatigue.

A bicycle frame structure that is manufactured by forming left and right panels and then bonding them in a pipe may include a first fixing member fixed to the rear end portion of a chain stay and a hanger coupled to the first fixing member, being capable of rotating around a hinge pin, and having an axle slit formed in a predetermined direction.

The first fixing member and the hanger may be hinged by the hinge pin so that the first drop-out rotates about a vertical axis (about a z axis) about the first fixing member.

The first fixing member and the hanger may be hinged by the hinge pin so that the first drop-out rotates about a horizontal direction (about an x axis) about the first fixing member.

The chain stay may include left and right chain stays disposed with a gap at left and right sides and the first fixing member and the hanger may be coupled to only one of the left and right chain stays.

The chain stay may include left and right chain stays disposed with a gap at left and right sides and the first fixing member and the hanger may be coupled to both of the left and right chain stays.

The structure may include a second fixing member fixed to the other one of the left and right chain stays and having an axle slit different from the axle slit.

A bicycle frame structure that is manufactured by forming left and right panels and then bonding them in a pipe may include: a first fixing member fixed to the rear end portion of a chain stay; a first drop-out coupled to the first fixing member and being capable of rotating around a first hinge pin; and a second drop-out coupled to the first drop-out, being capable of rotating around a second hinge pin, and having an axle slit formed in a predetermined direction.

The first fixing member and the first drop-out may be hinged by the first hinge pin so that the first drop-out rotates about a vertical axis (about a z axis) about the first fixing member.

The second drop-out and the first drop-out may be hinged by the second hinge pin so that the second drop-out rotates about a horizontal axis (about an x axis) about the first drop-out.

The chain stays may be disposed at left and right side with a gap therebetween and the first fixing member and the first and second hangers may be coupled to only one of the left and right chain stays.

The chain stays may be disposed at left and right side with a gap therebetween and the first fixing member and the first and second hangers may be coupled to both of the left and right chain stays.

The structure may include a second fixing member fixed to the other one of the left and right chain stays and having an axle slit different from the axle slit.

According to an exemplary embodiment of the present invention for achieving the objects, wheel alignment can be easily and precisely adjusted by the fixing members fixed to the rear end portions of the stays and the hangers hinged to the fixing members by hinge pins and having an axle slit.

In particular, even if the left and right stays are twisted, it is possible to easily maintain the wheel alignment by keeping the rotatable hangers hinged by the hinge pins at a predetermined angle.

Therefore, it is possible to reduce a loss of power to be transmitted to a wheel, reduce eccentric wear of a tire, and reduce damage to a frame due to accumulation of eccentric fatigue.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
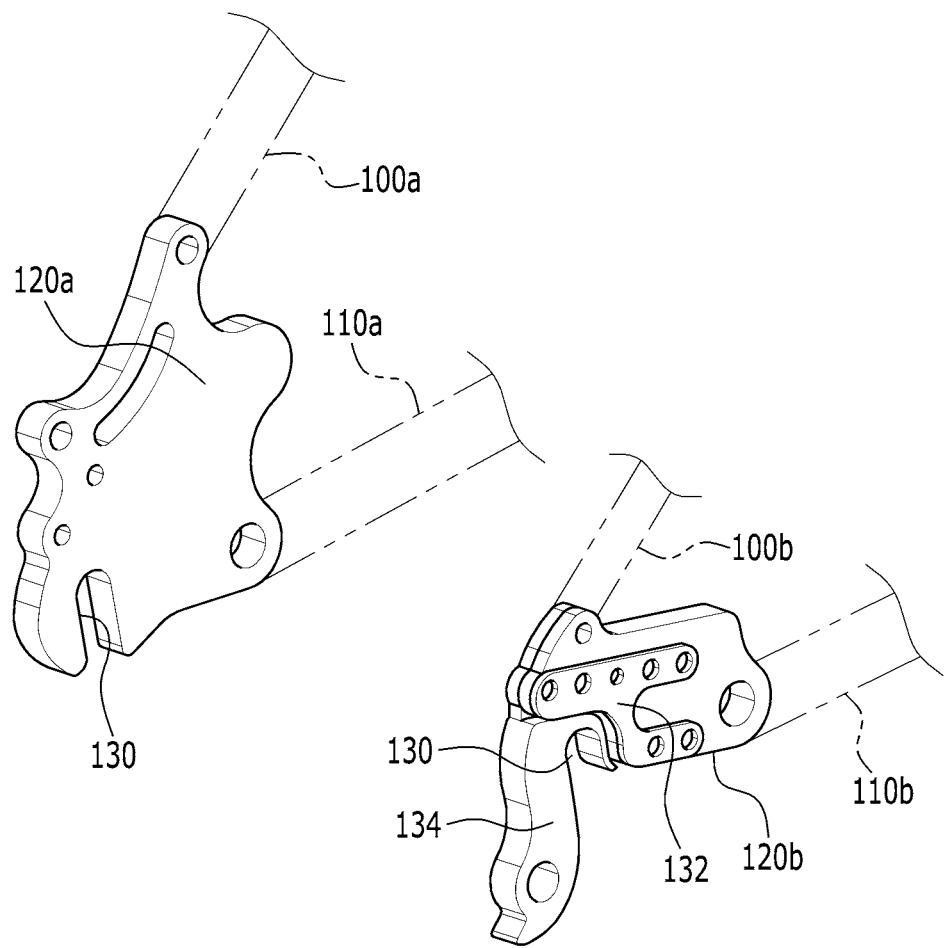
FIG. 1 is a partial perspective view of a bicycle frame structure related to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The sizes and thicknesses of the configurations shown in the drawings are provided selectively for the convenience of description, such that the present invention is not limited to those shown in the drawings and the thicknesses are exaggerated to make some parts and regions clear.

The unrelated parts to the description of the exemplary embodiments are not shown to make the description clear and like reference numerals designate like elements throughout the specification.

Using the terms of the first and the second etc. is for discriminating the components having the same name and they are not limited to the order.

FIG. 1 is a partial perspective view of a bicycle frame structure related to the present invention.

Referring to FIG. 1, in a bicycle frame structure, a stay includes a left seat stay 100a, a left chain stay 110a, a right seat stay 100b, and a right chain stay 110b, in which a left fixing member 120a is fixed to the left stays 100a and 110a.

An axle slit 130 that is open downward is formed at the lower portion of the rear end portion of the left fixing member 120a. The axle slit 130 is a space for receiving the axle of a rear wheel.

Further, a right fixing member 120b is fixed to the rear end portions of the right stays 100b and 110b, and a guide 132 is fixed to a side of the right fixing member 120b and a hanger 134 is fixed to the opposite side of the guide 132.

The guide 132 moves forward and backward on the right fixing member 120b and an axle slit 130 that is open downward is formed at the hanger 134. The axle slit 130 formed in the hanger 134 can be adjusted in height to fit to the shape of the hanger 134, so more precise wheel alignment is possible.

There is a need for specific work for tightening or loosening fasteners to adjust the guide 132 and it is required to replace the hanger 134 to adjust the height of the axle slit of the hanger 134.

Figure 2:
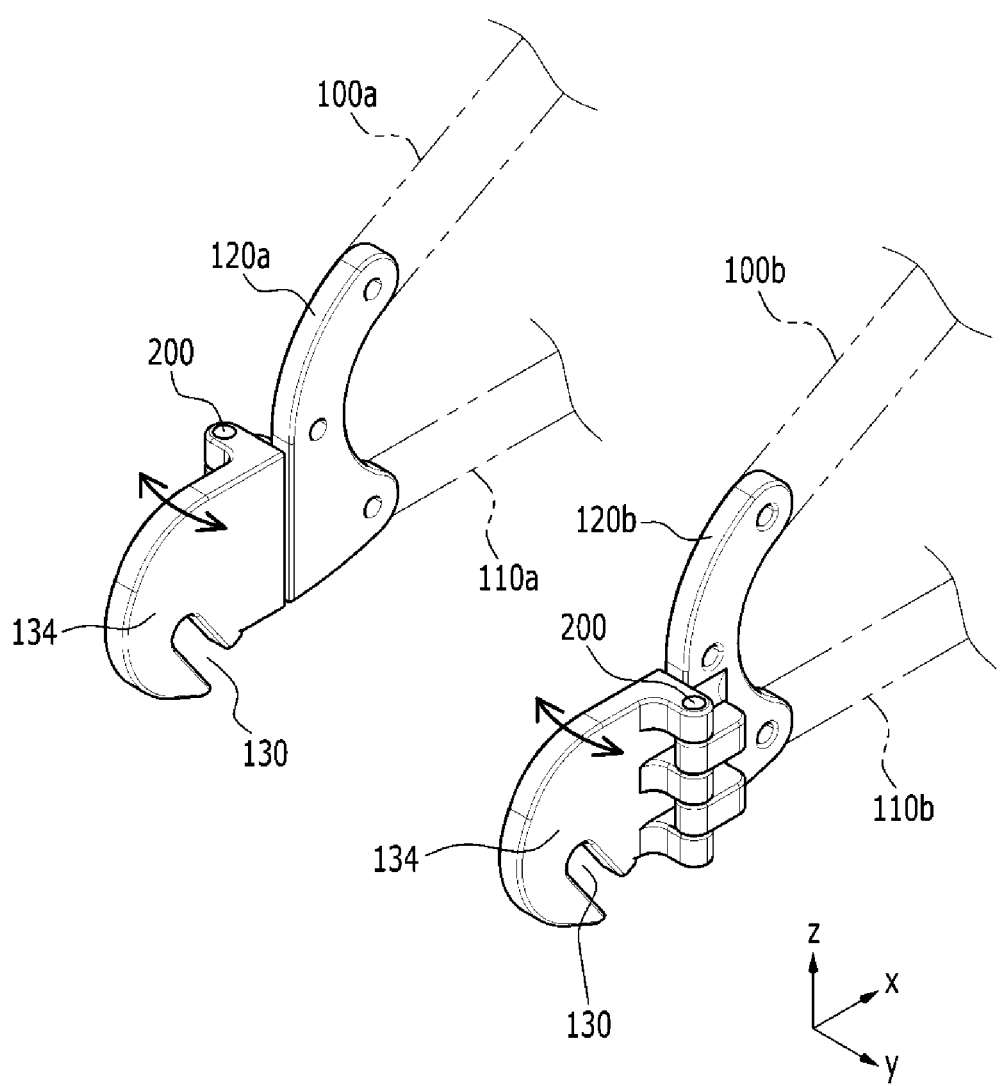
FIG. 2 is a partial perspective view of a bicycle frame structure according to an exemplary embodiment of the present invention.

FIG. 2 is a perspective view of a bicycle frame structure according to an exemplary embodiment of the present invention.

Referring to FIG. 2, in a bicycle frame structure, a stay includes a left seat stay 100a, a left chain stay 110a, a right seat stay 100b, and a right chain stay 110b, in which a left fixing member 120a and a right fixing member 120b are fixed respectively to the left stays 100a and 110a and the right stays 100b and 110b.

A hanger 134 is coupled to the left fixing member 120a fixed to the left stays 100a and 110a and can rotate about a hinge pin 200. The hinge pin 200 can rotate about the z axis (in the vertical direction), the hanger 134 coupled to the left fixing member 120a can rotate around the hinge pin 200 about the z axis, and an axle slit for receiving a left axle of a rear wheel is formed at the lower portion of the hanger.

Further, a hanger 134a is coupled to the right fixing member 120b fixed to the right stays 100b and 11b and can rotate about the hinge pin 200. The hinge pin 200 can rotate about the z axis (the vertical direction), the hanger 134 coupled to the right fixing member 120b can rotate around the hinge pin 200 about the z axis, and an axle slit for receiving a right axle of the rear wheel is formed at the lower portion of the hanger.

Figure 3:
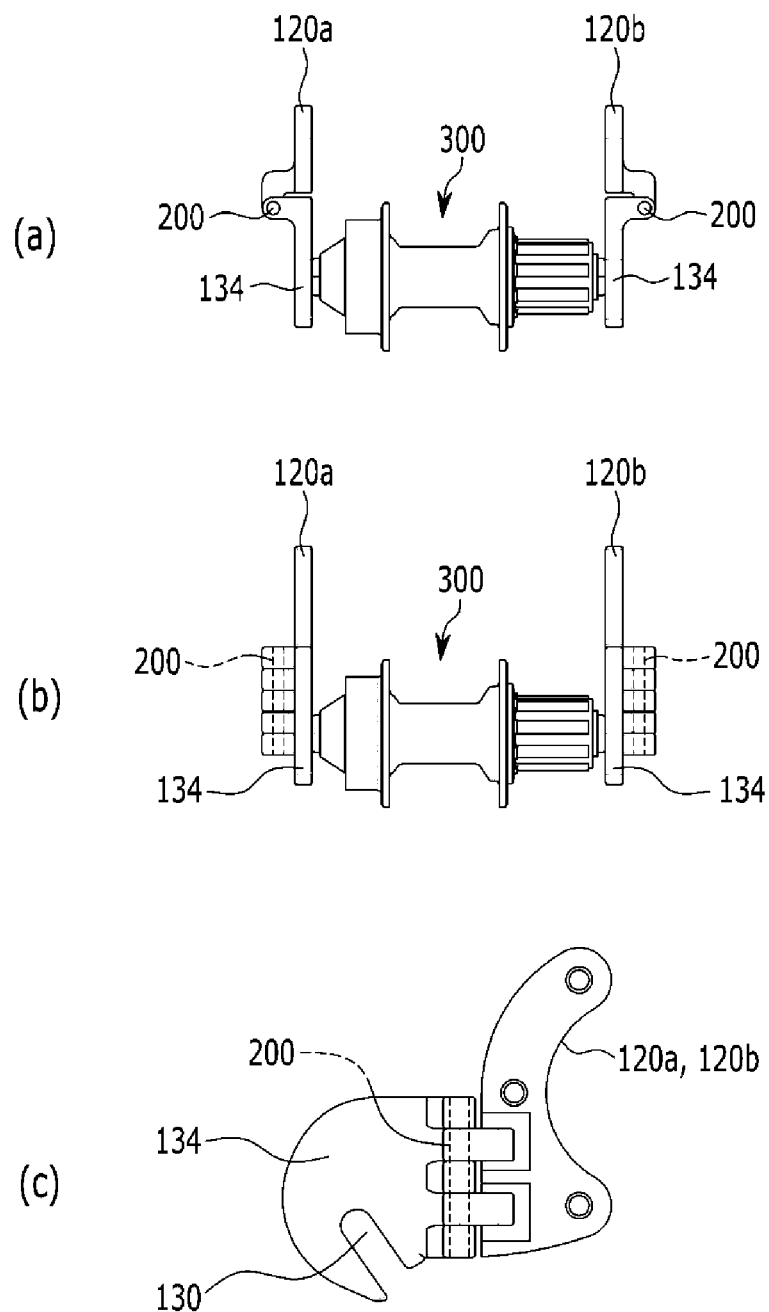
FIG. 3 is partially detailed plan view, rear view, and side view of the bicycle frame structure according to an exemplary embodiment of the present invention.

FIG. 3 is partially detailed plan view, rear view, and side view of the bicycle frame structure according to an exemplary embodiment of the present invention.

Referring to FIG. 3, the hangers 134 that can rotate about the hinge pin 200 are respectively coupled to the left fixing member 120a fixed to the left stays 100a and 110a and to the right fixing member fixed to the right stays 100b and 110b, and a hub axle is inserted in the axle slit 130 of the hanger 134.

Further, configurations known in the art are referred for a component for fixing the hangers 134 and the hub 300 (referred to as a "quick release") and the component is not described herein.

Figure 4:
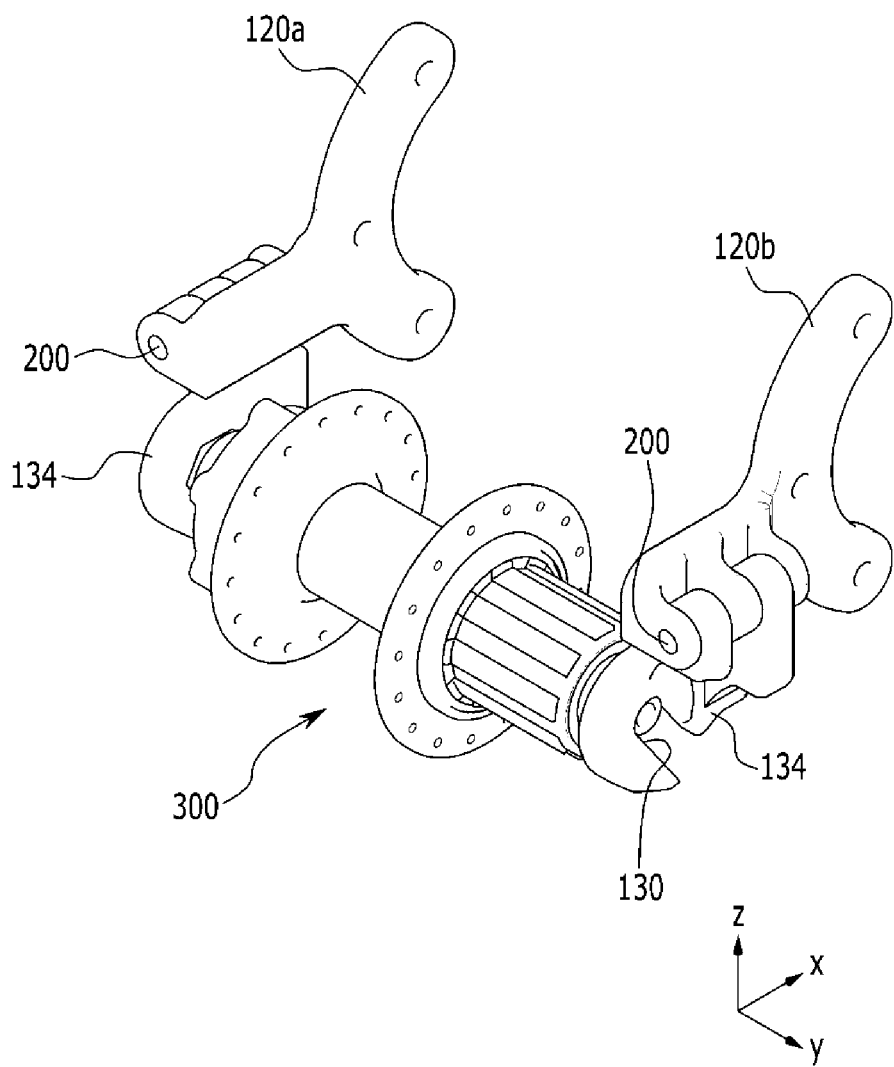
FIG. 4 is a partial perspective view of a bicycle frame structure according to another exemplary embodiment of the present invention.

FIG. 4 is a partial perspective view of a bicycle frame structure according to another exemplary embodiment of the present invention.

Referring to FIG. 4, the left fixing member 120a and the right fixing member 120b are fixed to the left stays 100a and 110a and the right stays 100b and 110b, respectively, in the bicycle frame structure.

A hanger 134 is coupled to the left fixing member 120a fixed to the left stays 100a and 110a and can rotate about a hinge pin 200. The hinge pin 200 can rotate about the x axis (about the horizontal direction) and an axle slit 130 for receiving the left axle of the rear wheel is formed at the lower portion of the hanger 134 on the left fixing member 120a.

Further, a hanger 134 is coupled to the right fixing member 120b fixed to the right stays 100b and 110b and can rotate about the hinge pin 200. The hinge pin 200 can rotate about the x axis (about the horizontal direction) and an axle slit 130 for receiving the right axle of the rear wheel is formed at the lower portion of the hanger 134 on the right fixing member 120b.

Further, an axle of a hub is inserted and fixed by a fixing device in the axle slits 130 of the hangers 134 disposed at the left and right sides.

Figure 5:
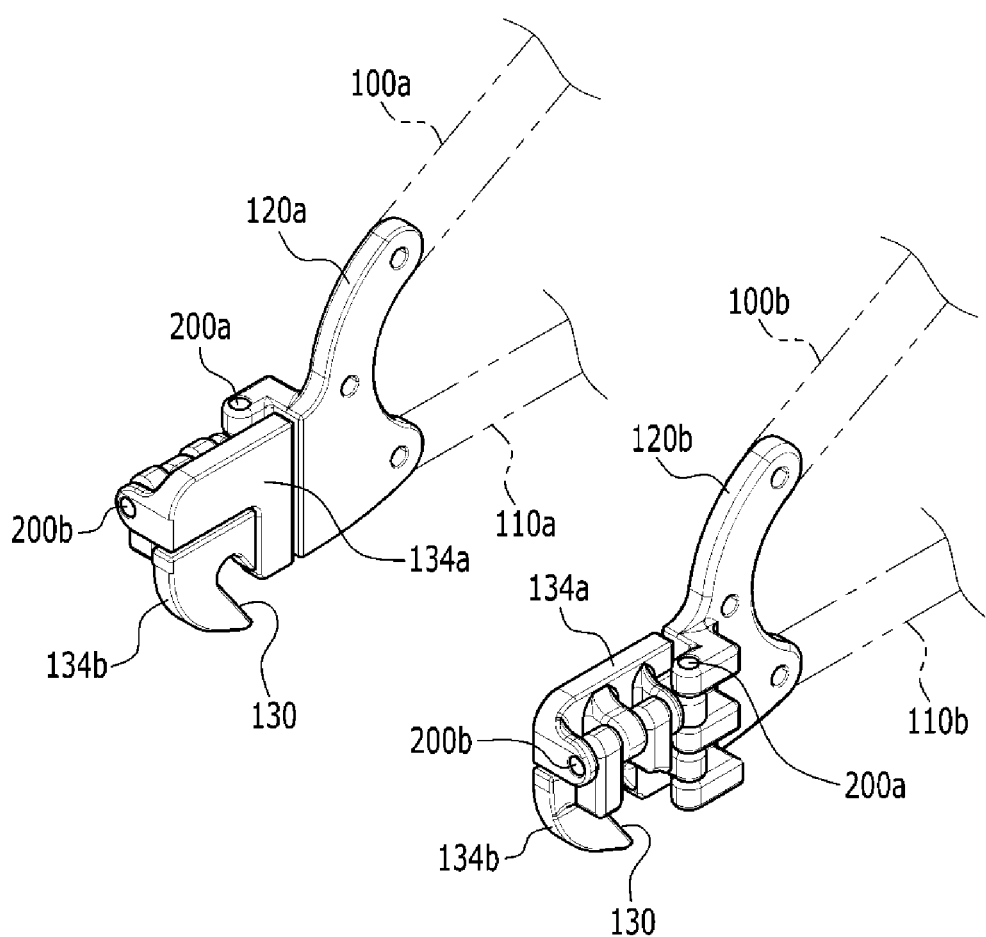
FIG. 5 is a partial perspective view of a bicycle frame structure according to another exemplary embodiment of the present invention.

FIG. 5 is a partial perspective view of a bicycle frame structure according to another exemplary embodiment of the present invention.

Referring to FIG. 5, a left fixing member 120a is disposed at the rear end portions of left stays 100a and 110a including a left seat stay 100a and a left chain stay 110a.

A first drop-out 134a is coupled to the left fixing member 120a for the left stays 100a and 110a and can rotate about the x axis around a first hinge pin 200a and a second drop-out 134b is coupled to the first drop-out 134a and can rotate about the z axis around a second hinge pin 200b. An axle slit 130 for receiving an axle is formed at the lower portion of the second drop-out 134b.

Accordingly, the second drop-out 134b coupled to the first drop-out 134a coupled to the left fixing member 120a can rotate within a predetermined range of angle about the x axis and z axis.

Further, the first drop-out 134a is coupled to the right fixing member 120b for the right stays 100b and 110b and can rotate about the x axis around a first hinge pin 200a and a second drop-out 134b is coupled to the first drop-out 134a and can rotate about the z axis around a second hinge pin 200b. An axle slit 130 for receiving an axle is formed at the lower portion of the second drop-out 134b.

Accordingly, the second drop-out 134b coupled to the first drop-out 134a coupled to the right fixing member 120b can rotate within a predetermined range of angle about the x axis and z axis.

In an exemplary embodiment of the present invention, although the first and second hangers 134a and 134b are coupled to the left stays 100a and 110a and the right stays 100b and 110b, respectively, the first and second hangers 134a and 134b may be coupled to only one of the left stays 100a and 110a and the right stays 100b and 110b and the other one may have the axle slit 130 in the fixing member without a hanger.

Figure 6:
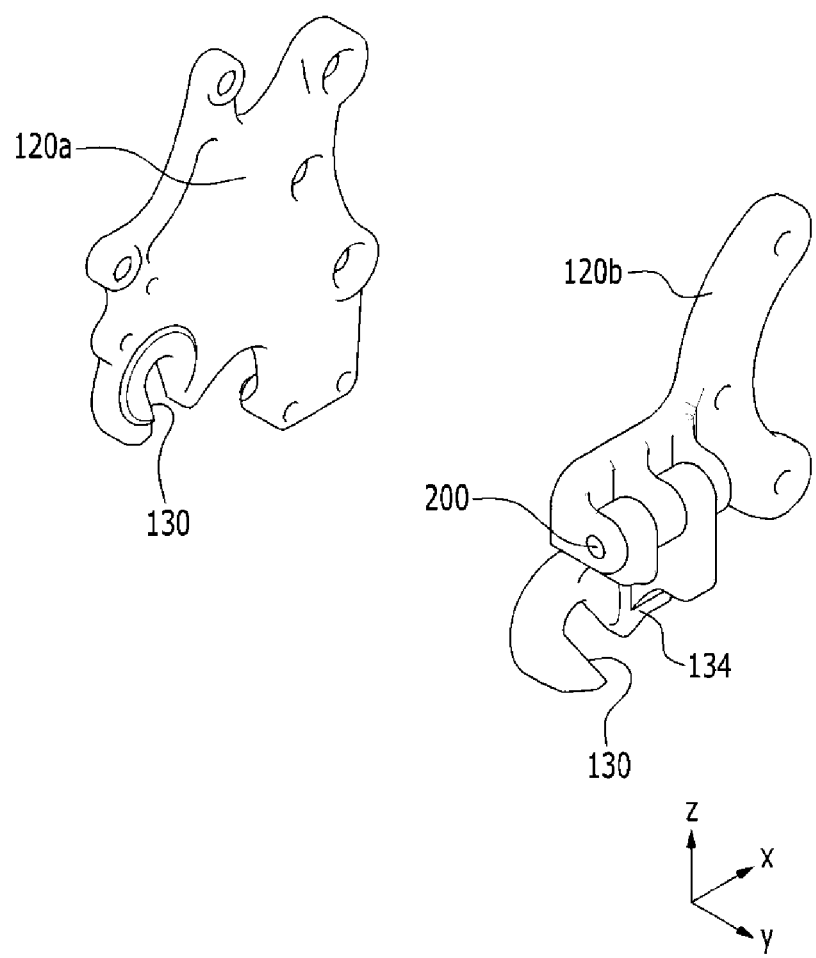
FIG. 6 is a partial perspective view of a bicycle frame structure according to a modified exemplary embodiment of the present invention.

FIG. 6 is a partial perspective view of a bicycle frame structure according to a modified exemplary embodiment of the present invention.

Referring to FIG. 6, a left fixing member 120a having an axle lit 130 at the lower portion is fixed to left stays 100a and 110a, a right fixing member 120b is fixed to right stays 100b and 110b, a first drop-out 134a is coupled to the right fixing member 120b and can rotate about x axis around a hinge pin 200, and an axle slit 130 for receiving an axle is formed at the lower portion of the first drop-out 134a.

In an exemplary embodiment of the present invention, one of the left fixing member 120a and the right fixing member 120b may be referred to as a first fixing member and the other one may be referred to as a second fixing member.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A drop-out structure for wheel alignment, comprising:
    a first drop out coupled to a first fixing member fixed to a rear end portion of at least one chain stay, being configured for rotating around a hinge pin, and having an axle slit; and
    a hub disposed at a center of a wheel and having an axle fitted in the axle slit.

2. The structure of claim 1, wherein the first fixing member and a first hanger of the first drop out are hinged by the hinge pin wherein the first hanger of the first drop-out rotates about a vertical axis around the first fixing member.

3. The structure of claim 1, wherein the first fixing member and a second hanger of the first drop out are hinged by the hinge pin wherein the second hanger of the first drop-out rotates about a horizontal direction around the first fixing member.

4. The structure of claim 1, wherein
    the at least one chain stay includes left and right chain stays spaced from each other, and
    the first fixing member and the first drop-out are coupled to only one of the left and right chain stays.

5. The structure of claim 4, including a second drop-out fixed to another one of the left and right chain stays and having an axle slit different from the axle slit.

6. The structure of claim 1, wherein
    the at least one chain stay includes left and right chain stays spaced from each other, and
    the first fixing member and the first drop-out are coupled to both of the left and right chain stays via a hub.

7. A drop-out structure for wheel alignment, the drop-out structure comprising:
    a first drop-out coupled to a first fixing member fixed to a rear end portion of at least one chain stay and being configured for rotating around a first hinge pin; and
    a second drop-out coupled to the first drop-out, being configured for rotating around a second hinge pin, and having an axle slit formed in a predetermined direction.

8. The structure of claim 7, wherein the first fixing member and the first drop-out are hinged by the first hinge pin wherein the first drop-out rotates about a vertical axis around the first fixing member.

9. The structure of claim 7, wherein the second drop-out and the first drop-out are hinged by the second hinge pin wherein the second drop-out rotates about a horizontal axis around the first drop-out.

10. The structure of claim 7, wherein
the at least one chain stay includes left and right chain stays,
the left and right chain stays are spaced from each other, and
the first fixing member and the first and second drop-outs are coupled to only one of the left and right chain stays.

11. The structure of claim 10, including a second fixing member fixed to another one of the left and right chain stays and having an axle slit different from the axle slit.

12. The structure of claim 7, wherein
the at least one chain stay includes left and right chain stays,
the left and right chain stays are spaced from each other, and
the first fixing member and the first and second drop-outs are coupled to both of the left and right chain stays via a hub.

* * * * *